United States Patent
Wang et al.

(10) Patent No.: US 10,908,666 B2
(45) Date of Patent: **\*Feb. 2, 2021**

(54) LOCATION TRACKING DEVICE CONFIGURED FOR LOW-POWER OPERATION

(71) Applicant: Gao Shu An Fu (Hangzhou) Technology Incorporation, Hangzhou (CN)

(72) Inventors: Chenyu Wang, Mountain View, CA (US); Jingxi Li, Mountain View, CA (US)

(73) Assignee: Gao Shu An Fu (Hangzhou) Technology, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,984

(22) Filed: Feb. 4, 2020

(65) Prior Publication Data

US 2020/0174544 A1 Jun. 4, 2020

Related U.S. Application Data

(63) Continuation of application No. 16/358,855, filed on Mar. 20, 2019, now Pat. No. 10,591,972, which is a
(Continued)

(51) Int. Cl.
*G06F 1/3228* (2019.01)
*H04W 4/02* (2018.01)
(Continued)

(52) U.S. Cl.
CPC ............ *G06F 1/3228* (2013.01); *G06F 1/329* (2013.01); *G06F 1/3243* (2013.01); *H04W 4/02* (2013.01);
(Continued)

(58) Field of Classification Search
CPC ...... G06F 1/3228; G06F 1/3243; G06F 1/329; H04W 4/029; H04W 4/50; H04W 4/02; H04W 52/0254
See application file for complete search history.

(56) References Cited

U.S. PATENT DOCUMENTS 9,852,599 B1 12/2017 Slavin et al.
2012/0100869 A1 4/2012 Liang et al.
(Continued)

*Primary Examiner* — Ernest G Tacsik
(74) *Attorney, Agent, or Firm* — Brian R. Short

(57) ABSTRACT

Methods, systems and apparatuses for of estimating a plurality of locations of an object are disclosed. One method includes receiving wireless signals from a plurality of base stations of a first network, sensing, by the tracking device, motion of the object, sampling, by the tracking device, the received wireless signals at least three times in response to the sensing motion of the object, downloading to the tracking device, characterizations of the wireless signals along a same route of transit, and estimating the plurality of locations of the tracking device based on signal characteristic of the samples of the received wireless signals received from the plurality of plurality of base stations, the information of the plurality of base stations, and predetermined knowledge of a transportation mode that is transporting the object including the characterizations of the wireless signal.

19 Claims, 9 Drawing Sheets

Related U.S. Application Data continuation-in-part of application No. 15/978,346, filed on May 14, 2018, now abandoned.

(60) Provisional application No. 62/830,477, filed on Apr. 7, 2019, provisional application No. 62/663,365, filed on Apr. 27, 2018, provisional application No. 62/509,589, filed on May 22, 2017.

(51) Int. Cl.

| | | |
|---|---|---|
| *G06F 1/329* | (2019.01) | |
| *G06F 1/3234* | (2019.01) | |
| *H04W 52/02* | (2009.01) | |
| *H04W 4/50* | (2018.01) | |
| *H04W 4/029* | (2018.01) | |

(52) U.S. Cl.
CPC ............ *H04W 4/029* (2018.02); *H04W 4/50* (2018.02); *H04W 52/0254* (2013.01)

(56) References Cited

U.S. PATENT DOCUMENTS

| | | |
|---|---|---|
| 2012/0309293 A1 | 12/2012 | Kummetz et al. |
| 2013/0107727 A1* | 5/2013 | Lunden ............. H04W 52/0251 370/252 |
| 2014/0247144 A1* | 9/2014 | Proud ................. A61B 5/0022 340/870.02 |
| 2015/0082167 A1* | 3/2015 | Yeh ........................ G01C 21/00 715/716 |
| 2015/0334535 A1* | 11/2015 | Nakata ................. H04W 4/029 701/461 |
| 2016/0125348 A1 | 5/2016 | Dyer et al. |
| 2017/0011210 A1 | 1/2017 | Cheong et al. |
| 2017/0169041 A1* | 6/2017 | Vijayvergiya ........ H04W 4/029 |
| 2017/0238143 A1* | 8/2017 | Park ................... H04W 52/0254 455/456.6 |
| 2017/0337033 A1* | 11/2017 | Duyan ............... A63B 24/0062 |
| 2018/0027375 A1 | 1/2018 | Pradeep |
| 2018/0091939 A1 | 3/2018 | Venkatraman et al. |
| 2018/0192374 A1* | 7/2018 | Jain ....................... H04W 4/029 |
| 2019/0220081 A1* | 7/2019 | Wang .................... G06F 1/3228 |

\* cited by examiner

Receiving, by a receiver of a tag attached to the object, wireless signals from a plurality of base stations, wherein the wireless signals include information of each of the plurality of base stations that transmitted a corresponding wireless signal
610

Sensing, by the receiver, motion of the object
620

Sampling, by the receiver, the received wireless signals at least three times after sensing motion of the object
630

Estimating a plurality of locations of the receiver based on the a signal characteristic of the samples of the received wireless signals, the information of the plurality of base stations, and predetermined knowledge of a transportation mode that is transporting the object
640

LOCATION TRACKING DEVICE CONFIGURED FOR LOW-POWER OPERATION

RELATED PATENT APPLICATIONS

This patent application claims priority to U.S. Provisional Patent Application No. 62/830,477, filed Apr. 7, 2019, and is continuation of U.S. patent application Ser. No. 16/358,855, filed Mar. 20, 2019, which claims priority to U.S. Provisional Patent Application No. 62/663,365, filed Apr. 27, 2018, which is a continuation-in-part (CIP) of U.S. patent application Ser. No. 15/978,346, filed May 14, 2018, which claims priority to U.S. Provisional Patent Application No. 62/509,589, filed May 22, 2017, all of which are herein incorporated by reference.

FIELD OF THE DESCRIBED EMBODIMENTS

The described embodiments relate generally to location-based services. More particularly, the described embodiments relate to methods, systems and apparatuses of a location tracking device configured for low-power operation.

BACKGROUND

It is difficult to track and monitor goods and people. The methods available require a trade-off between the accuracy of devices used to track and monitor, and the power consumed by the devices that track and monitor. It is desirable to have methods, systems and apparatuses for adaptively controlling a tradeoff between computational accuracy and power consumption of a mobile device that operates to select a condition of a subject or device.

SUMMARY

An embodiment includes a method of estimating a plurality of locations of an object, including receiving, by a first radio of a tracking device attached to the object, wireless signals from a plurality of base stations of a first network, wherein the wireless signals include information of each of the plurality of base stations of the first network that transmitted a corresponding wireless signal, sensing, by the tracking device, motion of the object, sampling, by the tracking device, the received wireless signals at least three times in response to the sensing motion of the object, downloading to the tracking device through a second radio of the tracking device from a second network, characterizations of the wireless signals along a same route of transit, wherein the characterizations of the wireless signals are previously determined by a high-power location monitoring device that previously measured and stored received wireless signal qualities while receiving the wireless signals from the plurality of base station while travelling the same route of transit, and estimating the plurality of locations of the tracking device based on signal characteristic of the samples of the received wireless signals received from the plurality of plurality of base stations, the information of the plurality of base stations, and predetermined knowledge of a transportation mode that is transporting the object including the characterizations of the wireless signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method of a location tracking device, according to an embodiment.

DETAILED DESCRIPTION

The embodiments described include methods, apparatuses, and systems for adaptively controlling a tradeoff between computational accuracy and power consumption of a mobile device that operates to select a condition of a subject or device. For an embodiment, the selection of the condition is based at least in part upon tracking of the location of the subject or device.

Figure 1:
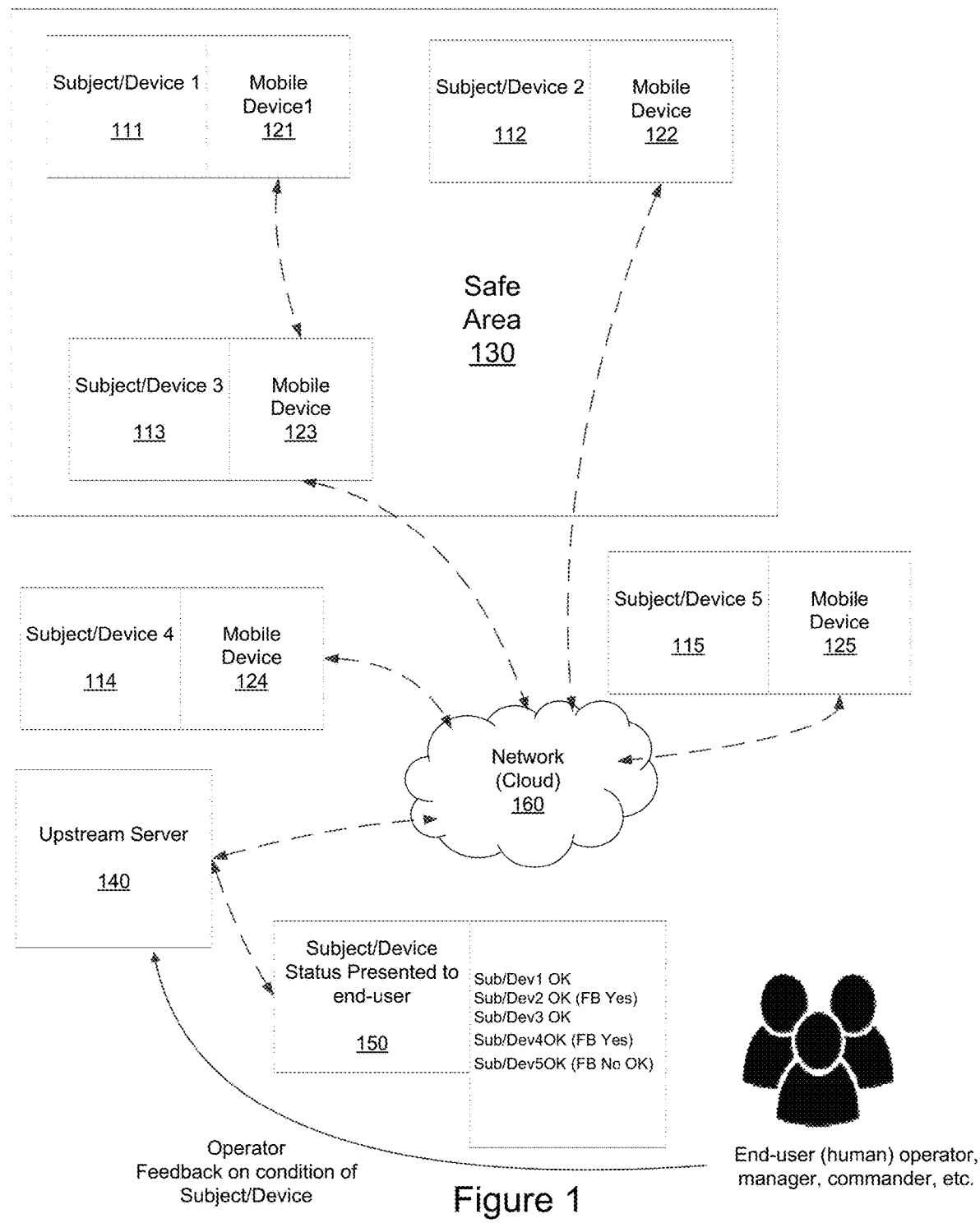
FIG. 1 shows several subject/devices associated mobile device, wherein the mobile devices operate to select a condition of its corresponding associated subject/devices, according to an embodiment.

FIG. 1 shows several subject/devices 111, 112, 113, 114, 115. Each of the subject/devices 111, 112, 113, 114, 115 has a corresponding associated mobile device 121, 122, 123, 124, 125. The mobile devices 121, 122, 123, 124, 125 operate to select a condition of its corresponding associated subject/devices 111, 112, 113, 114, 115. While operating to select the condition of its associated subject/device, the mobile device adaptively controls a tradeoff between computational accuracy and power consumption of the mobile device.

For an embodiment, a mobile device 121 operates to receiving a set of predetermined tasks of a subject/device 111 associated with the mobile device 121. The mobile device 121 further operates to selectively activating a plurality sensors of the mobile device 121 based on the set of predetermined tasks. Further, a location of the mobile device 121 is estimated by one or more sensors of the selectively activated plurality of sensors of the mobile device 121. Once activated, sensed information of the mobile device 121 is sensed by the plurality of selectively activated sensors. The mobile device 121 or an upstream network 160 (or a combination of the mobile device 121 and the upstream network) operate to select a condition of the subject/device 111 based on the estimated location, the set of predetermined tasks, and the sensed information of the plurality of selectively activated sensors.

As previously described, and as shown in FIG. 1, each of the plurality of mobile devices 121, 122, 123, 124, 125 operate to select a condition of its corresponding associated subject/devices 111, 112, 113, 114, 115. Accordingly, for an embodiment, conditions of one or more of the plurality of subject/devices 111, 112, 113, 114, 115 are selected by the plurality of mobile devices 121, 122, 123, 124, 125, or by the plurality of mobile devices 121, 122, 123, 124, 125 in conjunction with the upstream server 140, or by the upstream server 140 based on information receive from the plurality of mobile devices 121, 122, 123, 124, 125.

For at least some embodiments, the plurality of mobile devices 121, 122, 123, 124, 125 further monitor and coordinate each of the plurality of subjects or plurality of devices. For at least some embodiments, the monitoring and coordinating of the subject/devices includes monitoring and coordinating that prisoners or mental patients stay in a controlled area (such as, a safe area 130), and cannot run away. The sensors can include absolute (GPS) coordinates for outdoor tracking, and relative (e.g. relative to beacons whose position is accurately known) coordinates for indoor location tracking. Further, for at least some embodiments, the monitoring and coordinating of the subject/devices includes monitoring and coordinating that vehicles stay on track as planned. Further, for at least some embodiments, the monitoring and coordinating of the subject/devices includes monitoring and coordinating that a box/pilot of goods is lifted or moved by authorized person or machine.

A embodiment includes a system (such as formed by the mobile devices 121, 122, 123, 124, 125, and/or network 160, and/or upstream server 140) that includes a network of heterogeneous devices which can coordinate among themselves (either in a master-slave mode, or peer-to-peer mode) to monitor and communicate locations and conditions of each of the subjects/devices, in order to provide monitoring of certain subjects/devices to a set of end-users.

For at least some embodiment, the subject/devices 111, 112, 113, 114, 115 being monitored includes machines or equipment that are managed by property-management logistics (e.g. shipping containers, generators, expensive minerals/resources), or people who are required to be monitored (e.g. workers for safety concerns, outdoor prisoners, or medicated patients), or high valued animals and live stocks.

At least some embodiments further include reporting the condition of the subject or the device, including determining whether the subject or the device are successfully performing a particular set of tasks, comprising reporting whether the subject or the device is safe, whether the subject or the device is on schedule, whether the subject or the device is still within control. For at least some embodiments, data of each subject/device is monitored and collected to determine subject's condition in order to determine if the subjects are successful performing certain tasks. For a specific embodiment, this includes binary decision tasks in order to reduce data exchange between users and the subjects. Examples include is the subject is in a safe environment or not, is the subject on-schedule or not, is the subject still under or within a controlled region or not.

At least some embodiments include reporting the condition of the subject or the device to users as shown by presenting the subject/device status to end-users 150. Further, at least some embodiment further include receiving feedback from the users regarding accuracy of the selected condition, and determining false positive identification of the reported condition of the subject or the device. An exemplary list is shown in FIG. 1 that includes sub/dev1 OK, sub/dev2 OK—and feedback (FB) from the end-users indicates that the OK status for sub/dev2 is a yes that indicates the OK status is correct, sub/dev3 OK, sub/dev4 OK—and feedback (FB) from the end-users indicates that the OK status for sub/dev4 is a yes that indicates the OK status is correct, sub/dev5 OK—and feedback (FB) from the end-users indicates that the OK status for sub/dev4 is a no that indicates the OK status is incorrect.

For at least some embodiments, as shown in FIG. 1, false positive identification is included from human verification (e.g. observed from command center, or from a master device which is capable of verifying and recording ground truth). Separate tools and systems to allow for false negative observations are also necessary to increase overall detection accuracy. For an embodiment, a set of users can provide feedback for the mobile devices and take care of both false positives/negatives. True positives can be sampled in order to improve the overall system detection accuracy.

At least some embodiments include each mobile device selecting a power mode for determining which of the plurality of sensors of the mobile device to activate. For at least some embodiments, the power modes include a sleep mode, a mid-power mode, and a high-power mode, and wherein the mobile device cycles through the power modes. For at least some embodiments, at least one mobile device records and reports its state and location persistently, and will cycle through the following states:

1. Sleep mode: motion sensor+wireless signature recording. System can go to sleep (timer on, alarm off). The goal is to save power as much as possible.
2. Mid power mode, motion shows subject movement or wireless signature changed (either subject changed location or someone/something approached subject). System wakes up from sleep (timer off, alarm on). Collect more data (motion+wireless with more sampling) and triggers network location or even short periods of GPS (if available). The goal is check whether it should go to high power mode or go back to sleep.
3. High power mode, perform certain tasks. e.g. turn on GPS for some time and submit location data to server to make a POI detection. Or turn sonar/radar to look at the surrounding environment, to detect approaching objects or check the subject moving status. After task done (e.g. get confirmation from server), it goes back to low power mode to sleep.

At least some embodiments further include detecting a place of the subject/device based on the estimated location, the condition of the subject/device, and the sensed information of the plurality of selectively activated sensors of the corresponding mobile device. Specifically, at least some embodiments include tracking and/or monitoring a location of a mobile device that is operating as a tracking device for tracking the location of the subject/device. For a specific embodiment, the tracking device tracks progress of a shipping vehicle, such as, a railroad car or boat that is progressing along railroad tracks or along a river.

At least some embodiments further include reselecting which of the plurality of sensors of the mobile device are activated based on the condition of the device.

For at least some embodiments, selectively activating the plurality sensors of the mobile device includes selecting a sampling rate of one or more of the plurality of selectively activated sensors. For at least some embodiments, estimating, by one or more sensors of the selectively activated plurality of sensors of the mobile device, a location of the mobile device comprises estimating the location at a rate set by the sampling rate.

At least some embodiments further include ignoring the possibility of the subject or a device being in a condition that is not on the set of predetermined tasks.

At least some embodiments further include selecting the condition of the subject or a device based on a sensed acceleration, magnetic field, received RF signals (WiFi), received GPS signals, or rotation of the mobile device.

At least some embodiments further include dynamically updating the selected sensed information based on the condition of the subject or a device.

At least some embodiments further include determining one or more locations of the mobile device based on the condition of the subject or a device.

At least some embodiments further include monitoring how long the subject or a device operates in one or more tasks of the set of predetermined tasks. A least some embodiments further include presenting a sequence of the monitored one or more tasks of the set of predetermined tasks of the subject or a device to an operator or the user.

For at least some embodiments a task includes a condition of the subject or a device.

Figure 2:
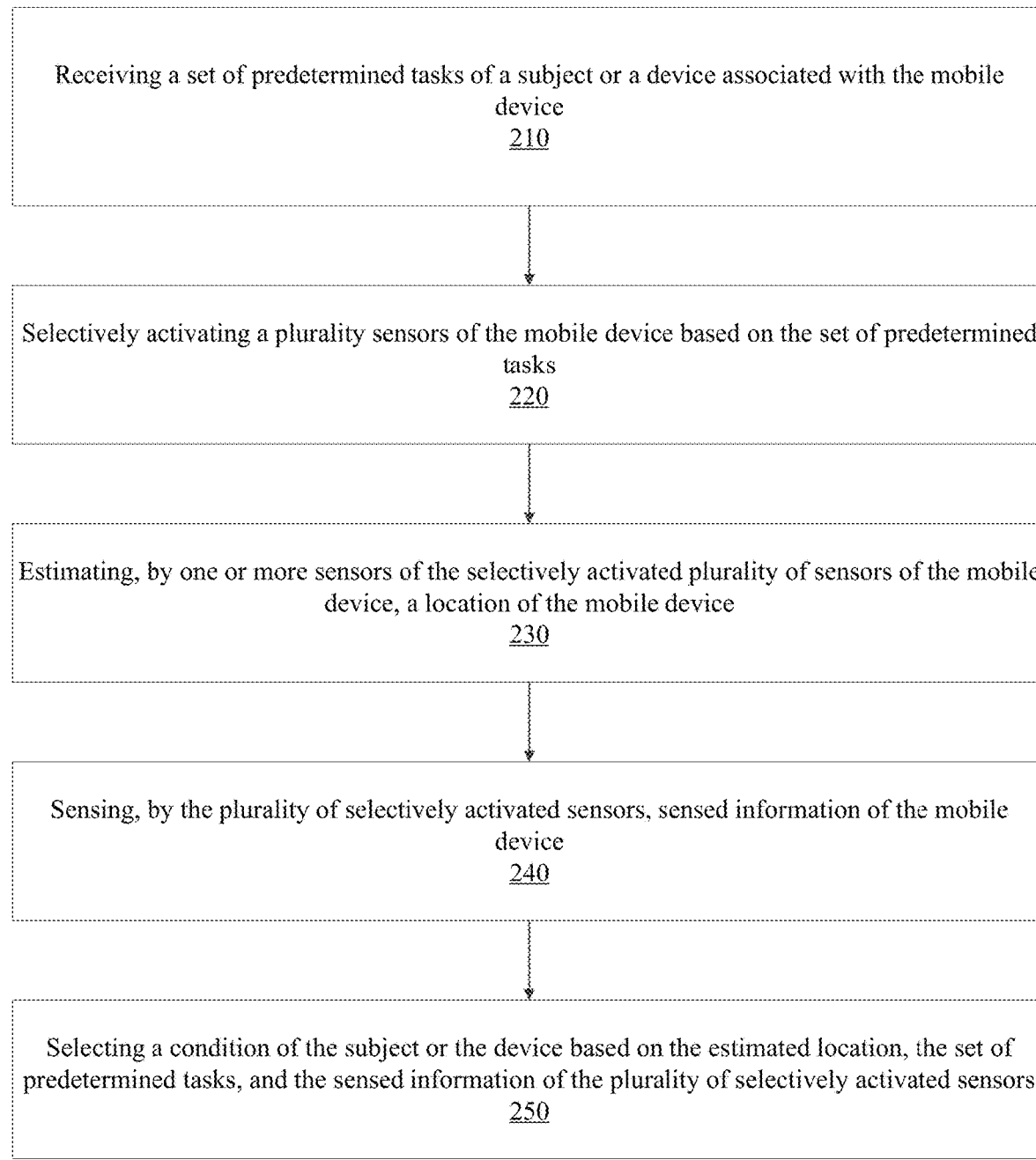
FIG. 2 is a flow chart that includes steps of a method of adaptively controlling a tradeoff between computational accuracy and power consumption of a mobile device, according to an embodiment.

FIG. 2 is a flow chart that includes steps of a method of adaptively controlling a tradeoff between computational accuracy and power consumption of a mobile device, according to an embodiment. A first step 210 includes receiving a set of predetermined tasks of a subject or a device associated with the mobile device. A second step 220 includes selectively activating a plurality sensors of the mobile device based on the set of predetermined tasks. A third step 230 includes estimating, by one or more sensors of the selectively activated plurality of sensors of the mobile device, a location of the mobile device. A fourth step 240 includes sensing, by the plurality of selectively activated sensors, sensed information of the mobile device. A fifth step 250 includes selecting a condition of the subject or the device based on the estimated location, the set of predetermined tasks, and the sensed information of the plurality of selectively activated sensors.

For at least some embodiments, the predetermined tasks include one or more of checking that the subject or object associated with the mobile device (machinery, worker or materials/supplies) is at a safe absolute or relative location (the absolute location can include latitude/longitude, altitude (or without altitude) coordinates, and the relative location can include x, y, z (or without z) inside a structure/building), checking that the subject or object associated with the mobile device has a moving condition and determined whether it is a safe moving condition (a safe moving condition can include moving together with a driving vehicle, and a potentially unsafe moving condition includes the subject being lifted or rotated, or the subject condition is open (the sealed box opened)), determining if the subject is moving with a vehicle, and checking whether the subject driving-trail is as scheduled, checking the subject's natural environment is safe or not, (for example, temperature, brightness or humidity), checking that the subject is in an unnatural environment, checking whether a person or machine is moving/lifting the subject, and if so, checking if the person or machine is authorized or not, checking whether the subject whether is under control, and behaving as pre-planned.

For at least some embodiments, the subjects or devices being monitored or tracked by the mobile device (or tracking device) includes one or more of machines without self-moving ability, such as, diesel or gas generators, power tools, vehicle trailers, boxes or pilot of goods, such as, raw materials, middle-step products, vehicles (machines with self-moving ability), such as, truck-based construction machines, delivery trucks, human beings, such as, construction workers for safety purpose, outside prisoners, patients with mental disability, expensive animals, such as, for commercial use or environmental purpose.

For at least some embodiments, the conditions of the of the subject or device includes one or more of determining no one is going to steal it, no one is going to harm or damage it, whether prisoners or mental patients stay in a controlled area, and cannot run away, determining whether animals stay in a controlled area.

At least some embodiments include selecting a condition of a plurality of subjects or a plurality of devices, wherein each of the plurality of subjects or the plurality of devices is associated with one of a plurality of mobile devices, and monitoring and coordinating, by the plurality of mobile device, each of the plurality of subjects or a plurality of devices. For at least some embodiments, the monitoring and coordinating includes at least one of monitoring and controlling prisoners or mental patients to stay in controlled area, and cannot run away (this can include absolute (GPS) coordinates for outdoor tracking, and relative (for example, relative to beacons whose position is accurately known) coordinates for indoor location tracking), monitoring and coordinating that vehicles stay on track as planned, monitoring and coordinating that a box/pilot of goods is lifted or moved by authorized person or machine.

At least some embodiments further include reporting the condition of the subject or the device, including determining whether the subject or the device are successfully performing a particular set of tasks, comprising reporting whether the subject or the device is safe, whether the subject or the device is on schedule, whether the subject or the device is still within control. For an embodiment, location and motion data are collected to estimate smart phone user's behavior (where and what he/she's doing). For this system, data is monitored and collected to determine subject's condition in order to determine if the subjects are successful performing certain tasks (specifically, these are binary decision tasks, in order to reduce data exchange between users and subjects. Some examples include determining whether the subject is in a safe environment or not, whether the subject is on-schedule or not, whether the subject is still under controlled region or not.

At least some embodiments further include reporting the condition of the subject or the device, receiving feedback from users regarding accuracy of the selected condition, and determining false positive identification of the reported condition of the subject or the device. At least some embodiments include false positive identification from human verification (e.g. observed from command center, or from a master device which is capable of verifying and recording ground truth). At least some embodiments include separate tools and systems to allow for false negative observations to increase overall detection accuracy. At least some embodiments include a set of users providing feedback for the devices, and taking care of both false positive/negatives, and sampling from true positives in order to improve overall system detection accuracy.

Figure 3A:
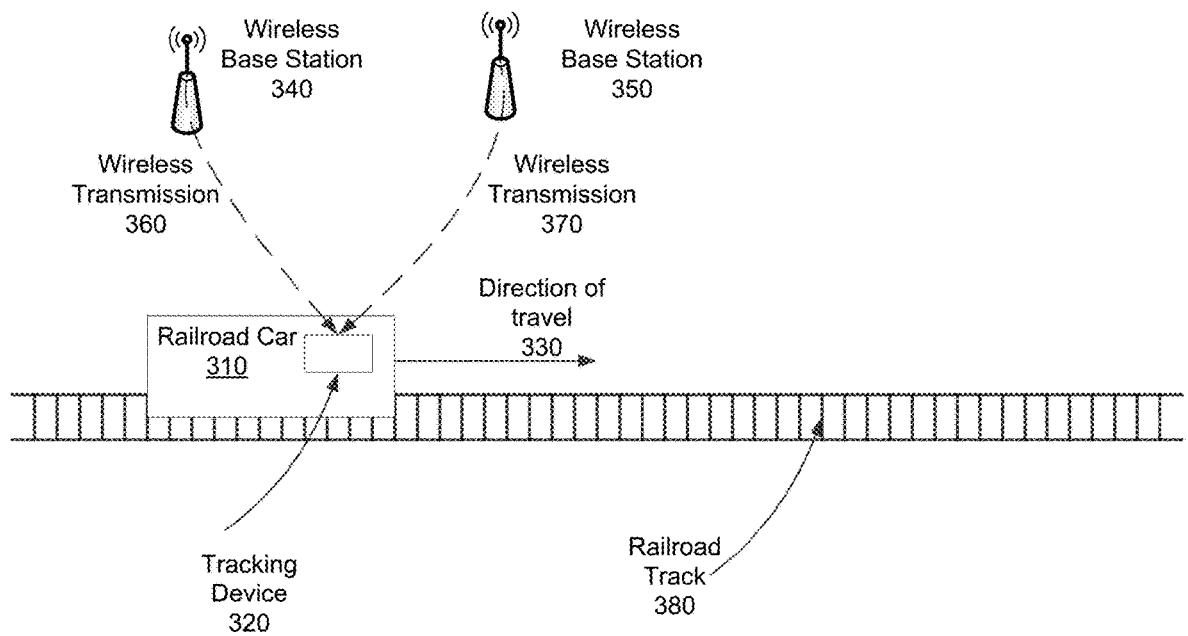
FIG. 3A, 3B show a tracking device being transported, wherein the tracking device tracks locations while the tracking device is in transit, according to an embodiment.
Figure 3B:
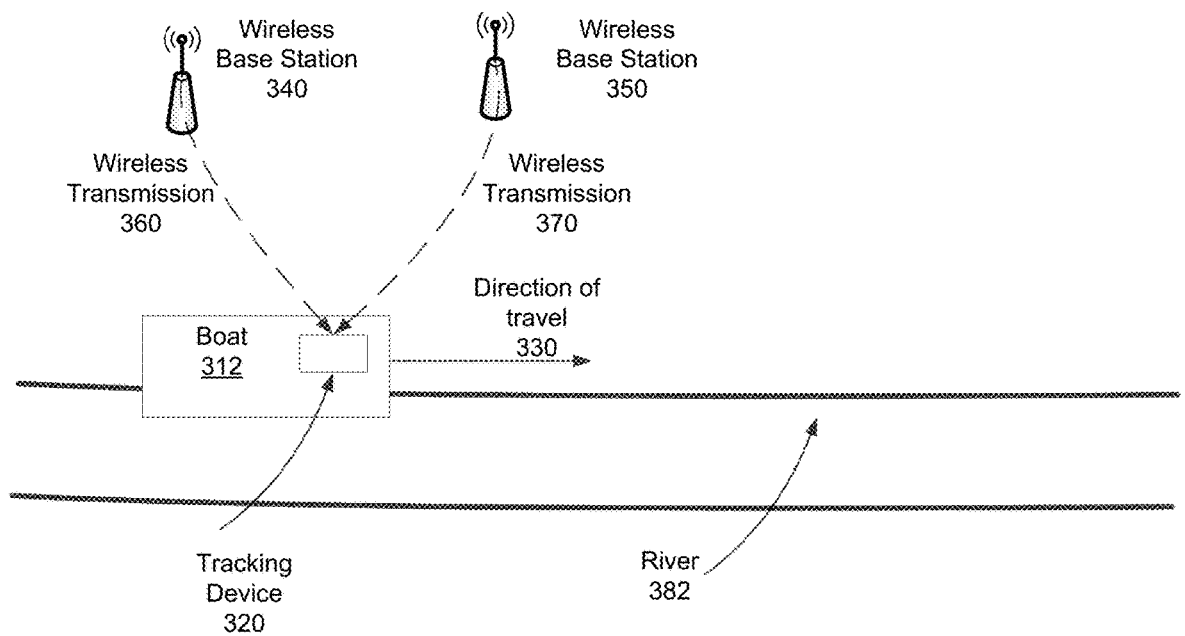

FIGS. 3A, 3B show a tracking (mobile) device 320 being transported, wherein the tracking device 320 tracks locations while the tracking device 320 is in transit, according to an embodiment. As shown, the tracking device 320 resides on a transportation device 310 (such as, a railroad car traveling on railroad tracks 380) while the tracking device 320 is in transit. As the tracking device 320 is in transit, a wireless receiver of the tracking device 320 receives wireless signals through wireless transmissions 360, 370 from base stations 340, 350.

For an embodiment, the tracking device measures a signal quality of the received signals as the tracking device 320 is traveling in a direction of travel 330. Further, the wireless signals include information that allows the tracking device 320 to identify which base station transmitted the received wireless signal. Based on the signal quality of the received signals and identification of which base station transmitted the received wireless signal, the location of the tracking device can be estimated. For example, the distance between a base station 340, 350 and the tracking device 320 can be estimated based on the received signal strength of the received wireless signals. That is, the amount of attenuation of a transmitted wireless signals during propagation between the base station and the tracking device provides an indication of the distance traveled by the wireless signal. Further, the identification of the base stations allows access to locations of the base stations. One or more locations of the tracking device can be estimated based on the locations of the base stations and the estimated distance between the base stations and the tracking device 320.

At least some embodiments further include improving the location estimations of the tracking device by limiting the tracking device to one-dimensional or nearly one-dimensional transportation. For example, railroad travel is restricted to travel over railroad tracks.

FIG. 3B shows a boat 312 on a river 382 that is restricted to travel up and down the river 382, according to an embodiment. Again, a river provides a nearly one-dimensional mode of travel. Accordingly, power saving modes of operation of the tracking device 320 can be utilized.

Figure 4A:
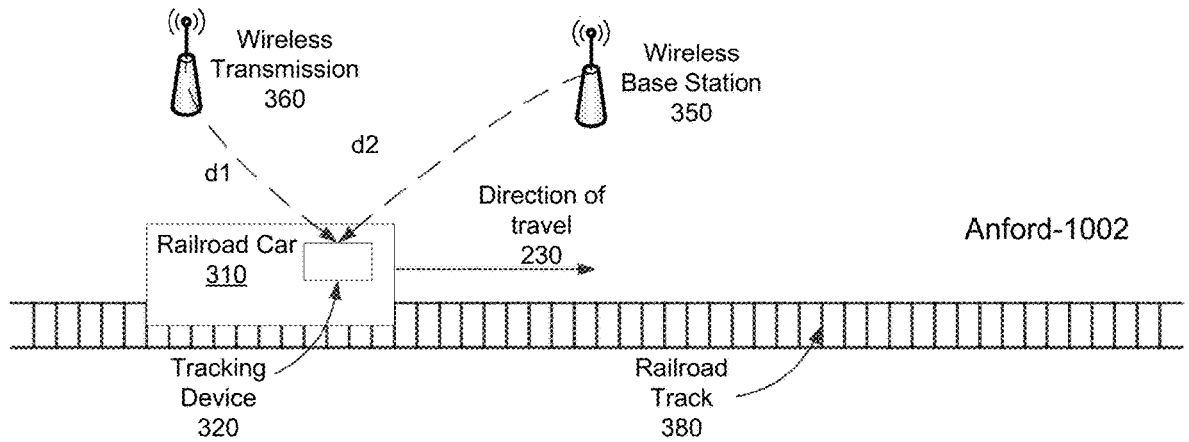
FIGS. 4A, 4B, 4C show operation of the tracking device, according to an embodiment.
Figure 4B:
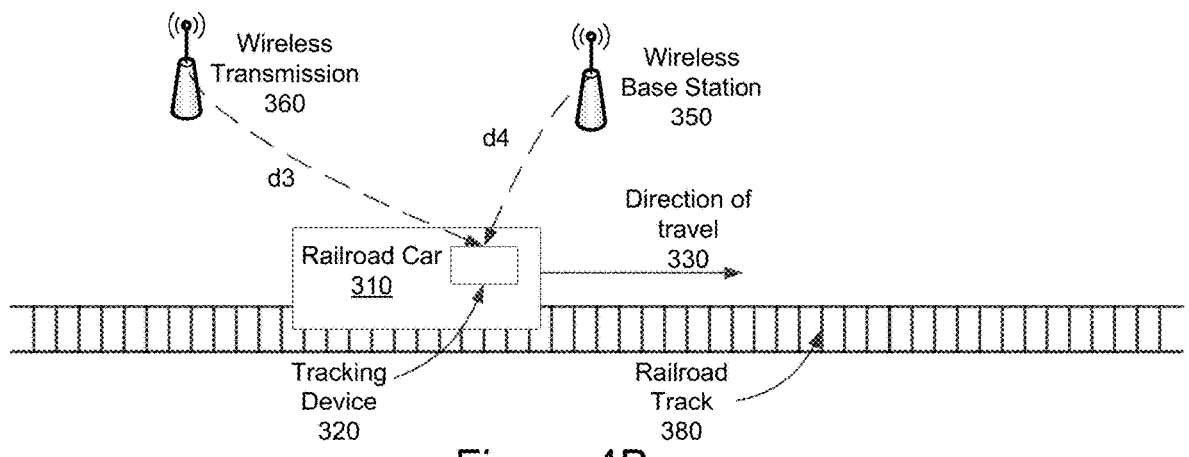
Figure 4C:
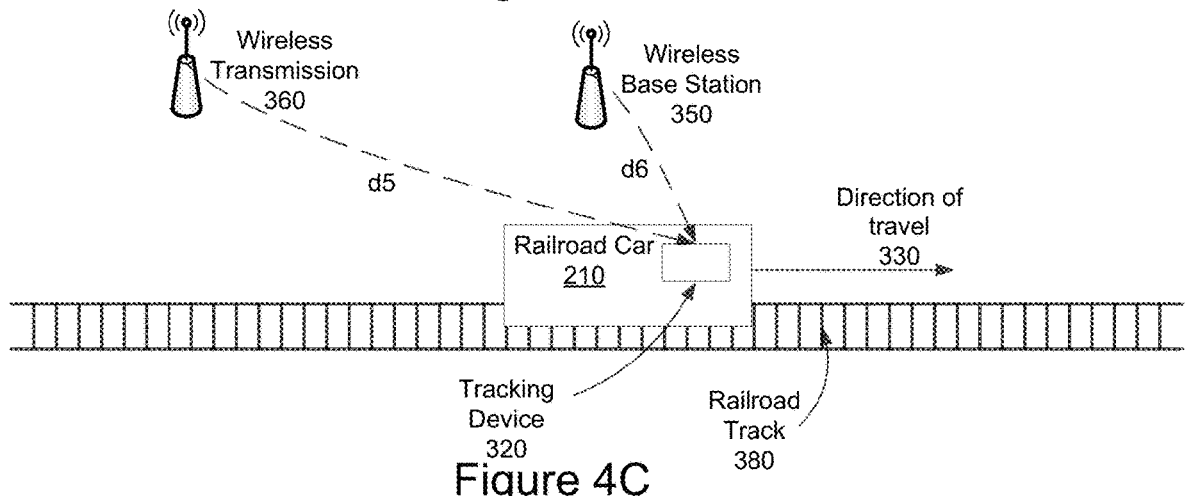

FIGS. 4A, 4B, 4C show operation of the tracking device, according to an embodiment. Specifically, FIGS. 4A, 4B, 4C show the tracking device 320 at three different locations while traveling on the railroad car 310 along the railroad tracks 380. FIG. 4A shows when the distance between the tracking device 310 and the base station 360 is d1 and the distance between the tracking device 310 and the base station 350 is d2. FIG. 4B shows when the distance between the tracking device 310 and the base station 360 is d3 and the distance between the tracking device 310 and the base station 350 is d4. FIG. 4C shows when the distance between the tracking device 310 and the base station 360 is d5 and the distance between the tracking device 310 and the base station 350 is d6.

For an embodiment, the receiver of the tracking device samples the received wireless signals at least three times after sensing motion of the object. The sampling begins after sensing motion because if no motion is sensed, then there is no reason to sample more than once because the tracking device is not in motion, and additional samples do not provide any additional information that can be used for tracking the location of the location tracking device.

The reasoning behind using at least three samples is depicted in FIGS. 4A, 4B, 4C. Specifically, a first location determination can be made based on the determined distances d1, d2 of FIG. 4A. A second location determination can be made based on the determined distances d3, d4 of FIG. 4B. A third location determination can be made based on the determined distances d5, d6.

Figure 5A:
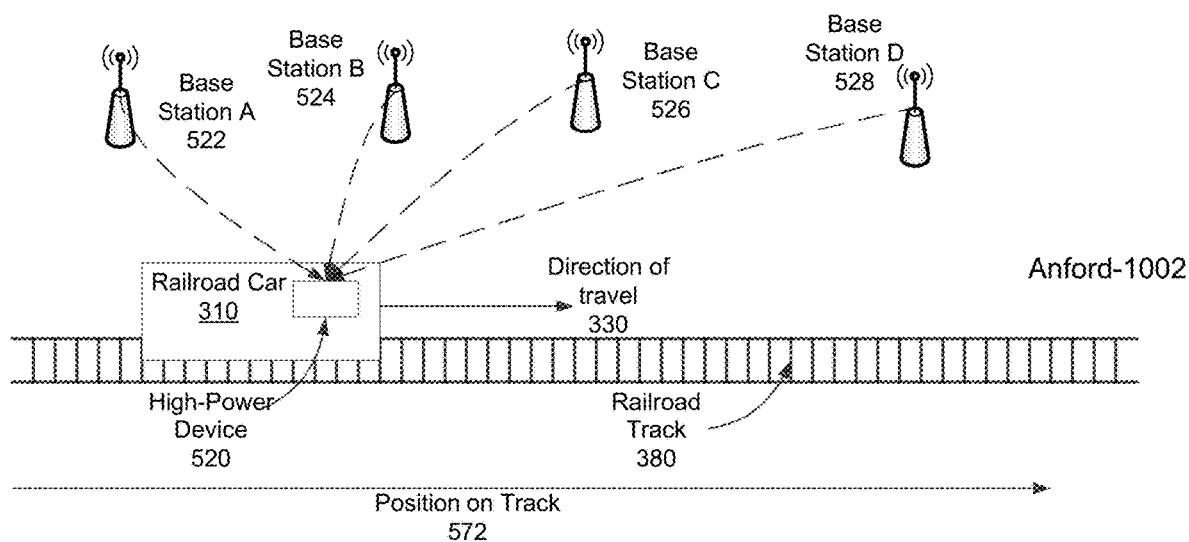
FIGS. 5A, 5B show a characterization process of the tracking device, according to an embodiment.
Figure 5B:
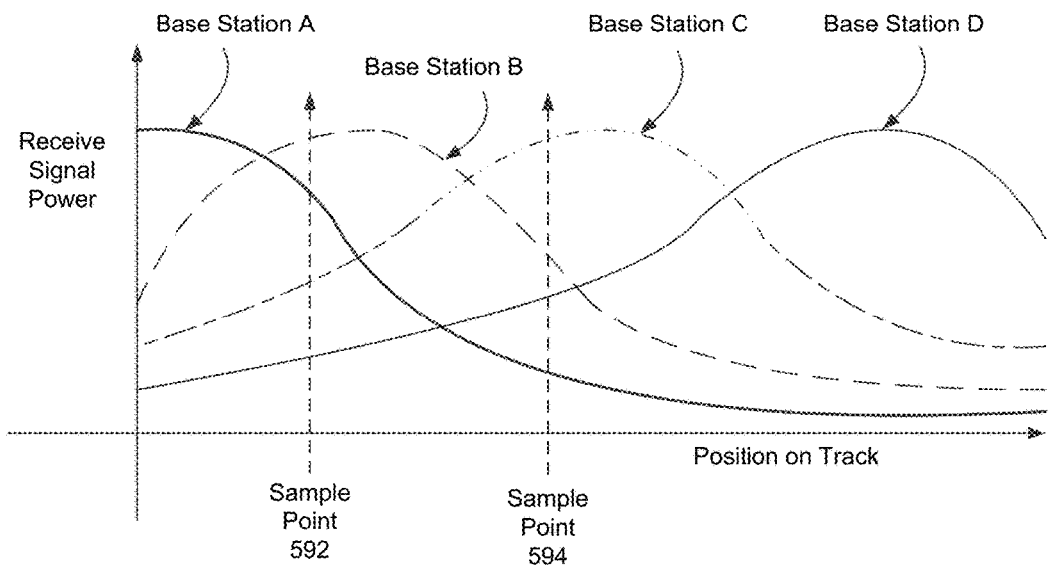

FIGS. 5A, 5B show a characterization process of the tracking device, according to an embodiment. As shown, a high power location determination device 520 is used for determining a calibration or characterization of the wireless signals received by the tracking device while in transit along the one dimensional travel path (such as, along the railroad or along a river). The calibration is obtained by monitoring and storing qualities of the wireless signals received from a plurality of base stations 522, 524, 526, 528 along the route of transmit.

The high power location determination device 520 includes an accurate location determination device (such as, a GPS receiver) that determines an accurate account of the location of the high power location determination device 520 while the high power location determination device 520 is also receiving wireless signals in transmit. As shown in FIG. 5B, a received signal power of wireless signals received from each of the base stations 522, 524, 526, 528 while the high power location determination device 520 varies along the route of transit. By storing the accurate location and the characteristics of the quality of the wireless signals received from the base stations 522, 524, 526, 528 at each of many different locations, a location of a tracking device can later be estimated based on the signal qualities of wireless signals received by the tracking device. For example, at a sample point 592 of the received signal power wireless signals received from each of the base stations 522, 524, 526, 528 can be measured and a corresponding accurate location estimate stored. If at a later time, a different location tracking device measures received signals having the same received signal qualities (such as, received signal power), an estimate of the location tracking device can be made by retrieving the stored locations for the various received signal powers. A second sample point 594 shows a different set of received signal powers, and the corresponding location (position on the track 380). Again, as shown, the position on the track (location) has a corresponding set of received signal powers. Sample points can be made all along the track in which received signal powers (or other receive signal qualities) are measure along with the corresponding location. As stated, for an embodiment, another device can later measure the same receive signal qualities, and then estimate its location based on the comparing the measured receive signal qualities with the previously stored signal qualities and the corresponding stored locations.

FIG. 6 is a flow chart that includes steps of a method of a location tracking device, according to an embodiment. A first step 610 includes receiving, by a receiver of a tracking device attached to the object, wireless signals from a plurality of base stations, wherein the wireless signals include information of each of the plurality of base stations that transmitted a corresponding wireless signal. A second 620 includes sensing, by the receiver, motion of the object. A third step 630 includes sampling, by the receiver, the received wireless signals at least three times after sensing motion of the object. A fourth step 640 includes estimating a plurality of locations of the receiver based on the a signal characteristic of the samples of the received wireless signals, the information of the plurality of base stations, and predetermined knowledge of a transportation mode that is transporting the object.

For at least some embodiments, the transportation mode limits the plurality of locations to one dimension. This condition allows for better power usage versus accuracy in the location determinations. For an embodiment, the predetermined knowledge of the transportation mode includes designating the transportation mode as railroad or waterway. That is, a railway only allows for travel along railroad tracks. This limits the degrees of freedom in the motion of the object the tracking device is attached to. Accordingly, predetermined routes of railroad tracks can be utilized to enhance the accuracy in location determination and tracking.

At least some embodiments further include identifying a condition of the transportation mode of the object based on the estimated locations of the receiver. Conditions can include the object moving too slow, or too fast. Further, the conditions can include task or other conditions of the object.

For at least some embodiments, the wireless signals are received from the plurality of base station through a first wireless network, and further comprising transmitting, by the tracking device, information relating to the identified condition through a second wireless network. That is, the wireless signals received by the wireless signal can be transmitted by any type of network that includes base stations transmitting wireless signals. The first wireless network may include base station dedicated merely to transmitting signals for providing location determination. Alternatively or additionally, the first wireless network may include another wireless communication system. The second wireless network can include a communication wireless network, such as, a cellular wireless network, a WiFi network, Bluetooth network, supersonic network, or radar network. The second wireless network provides for upstream data communication, wherein the upstream data communication may include the condition of the object.

At least some embodiments further include calibrating received signals along travel along the railroad. For an embodiment, this includes transporting along the railroad, a high-power, high-accuracy location determination device, monitoring characteristics of the receive wireless signals, and storing multiple locations of the high-power, high-accuracy location determination device and the associated monitored characteristics of the received wireless signals for each of the multiple of locations.

For at least some embodiments, estimating the plurality of locations of the receiver based on the signal characteristic of the samples of the received wireless signals, the information of the plurality of base stations, and predetermined knowledge of the transportation mode that is transporting the object further includes retrieving the monitored characteristics of the received wireless signals for each of the multiple of locations, comparing the retrieved monitored characteristics of the received wireless signals for each of the multiple of locations with the received wireless signals from the plurality of base stations, and further estimating the plurality of locations of the receiver based on the comparison between the retrieved monitored characteristics of the received wireless signals for each of the multiple of locations and the received wireless signals from the plurality of base stations.

Figure 7:
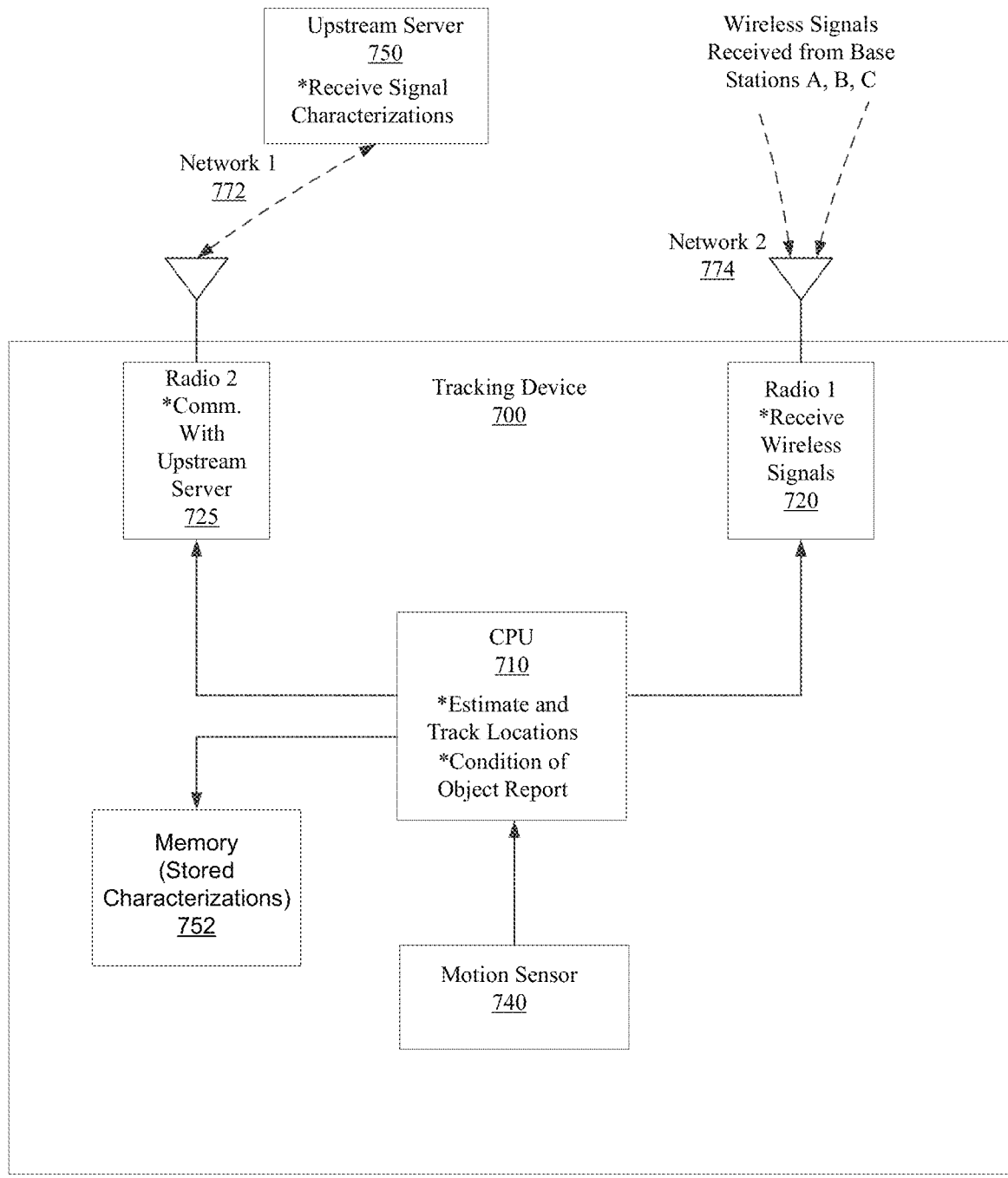
FIG. 7 is a block diagram of a location tracking device, according to an embodiment.

FIG. 7 is a block diagram of a location tracking device 700, according to an embodiment. As shown, the tracking device 700 includes a first radio (Radio 1) 720 that receives the wireless signals from the base stations (such as, previously described base stations A, B, C). A signal quality, such as received signal strength) of the received wireless signals is measured.

The location tracking device 700 includes a CPU 710. For an embodiment, the CPU 710 receives the measurements from the first radio 720 and estimates locations of the location tracking device 700 based on the signal characteristic of the samples of the received wireless signals, the information of the plurality of base stations, and predetermined knowledge of a transportation mode that is transporting the object.

For an embodiment, the CPU 710 can additionally determine a condition of the object associated with the tracking device based at least in part on the determined location of the object.

For an embodiment, the CPU 710 can additionally determine a place of a location of the object associated with the tracking device based at least in part on the determined location or sensed motions of the object.

For an embodiment, the location tracking device 700 further includes a motion sensor 740 for detecting motion of the tracking device 700 and the object. The location tracking only needs to be performed if the object is sensed to be moving.

For an embodiment, the tracking device 700 includes memory 752 in which characterizations of the received wireless signals can be stored. The tracking device 800 can utilize the characterization to improve the location tracking.

For an embodiment, the location tracking device 700 further includes a second radio (Radio 2) 725. The second radio 725 allows the tracking device 700 to download characterizations. Further, the second radio 725 allows the tracking device 700 to upload conditions of the object associated with the tracking device 700. For an embodiment, the functionality of the first radio and the second radio are included in a single radio. For an embodiment, the second radio 725 is wirelessly connected to an upstream server 750 through a first wireless network (network 1) 772 in which receive signal characterizations (such as, previous characterizations as shown in FIGS. 5A, 5B) are download, and conditions of the object associated with the tracking device are uploaded.

Further, for an embodiment, the first radio (radio 1) 720 receives wireless signals through a second network (Network 2) 774 that include, for example, the base stations A, B, C.

Figure 8:
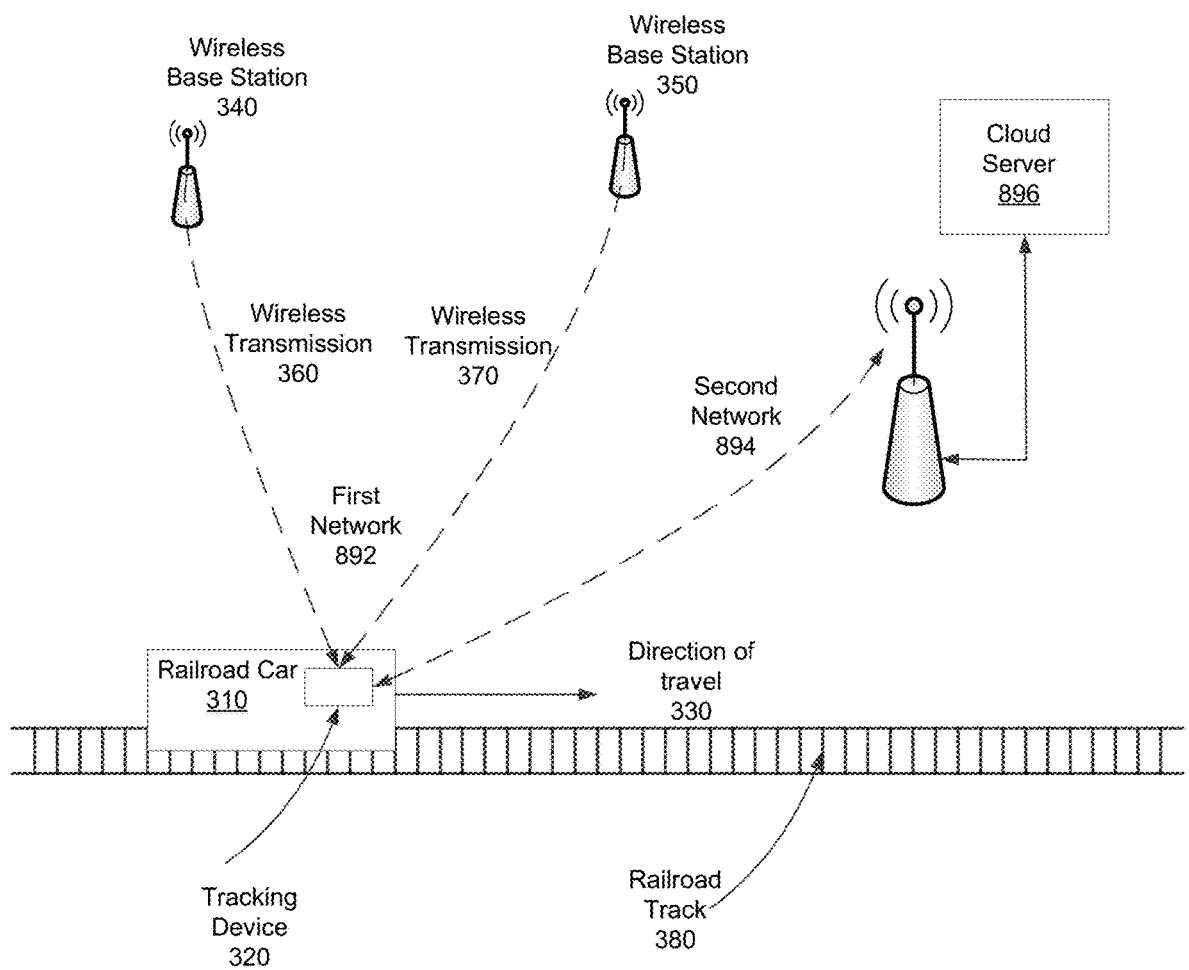
FIG. 8 shows a tracking device being transported, wherein the tracking device tracks locations while the tracking device is in transit, and the tracking device reports conditions of an object associated with the tracking device, according to an embodiment.

FIG. 8 shows a tracking device 320 being transported, wherein the tracking device 320 tracks locations while the tracking device 320 is in transit, and the tracking device reports conditions of an object associated with the tracking device, according to an embodiment.

As shown, for an embodiment, the tracking device 320 receives wireless signals through wireless transmissions 360, 370 from wireless base stations 340, 350 through a first network 892. For an embodiment, the tracking device 320 then tracks locations of the tracking device 320, and further determines a condition of an object or device associated with the tracking device based at least in part on the tracked locations. Further, the tracking device communicates the condition of the object or device to a cloud server 896 through a second network 894. For an embodiment, the second network 894 is a wireless network that is a different network than the first network 892. For an embodiment, they are the same network.

Figure 9:
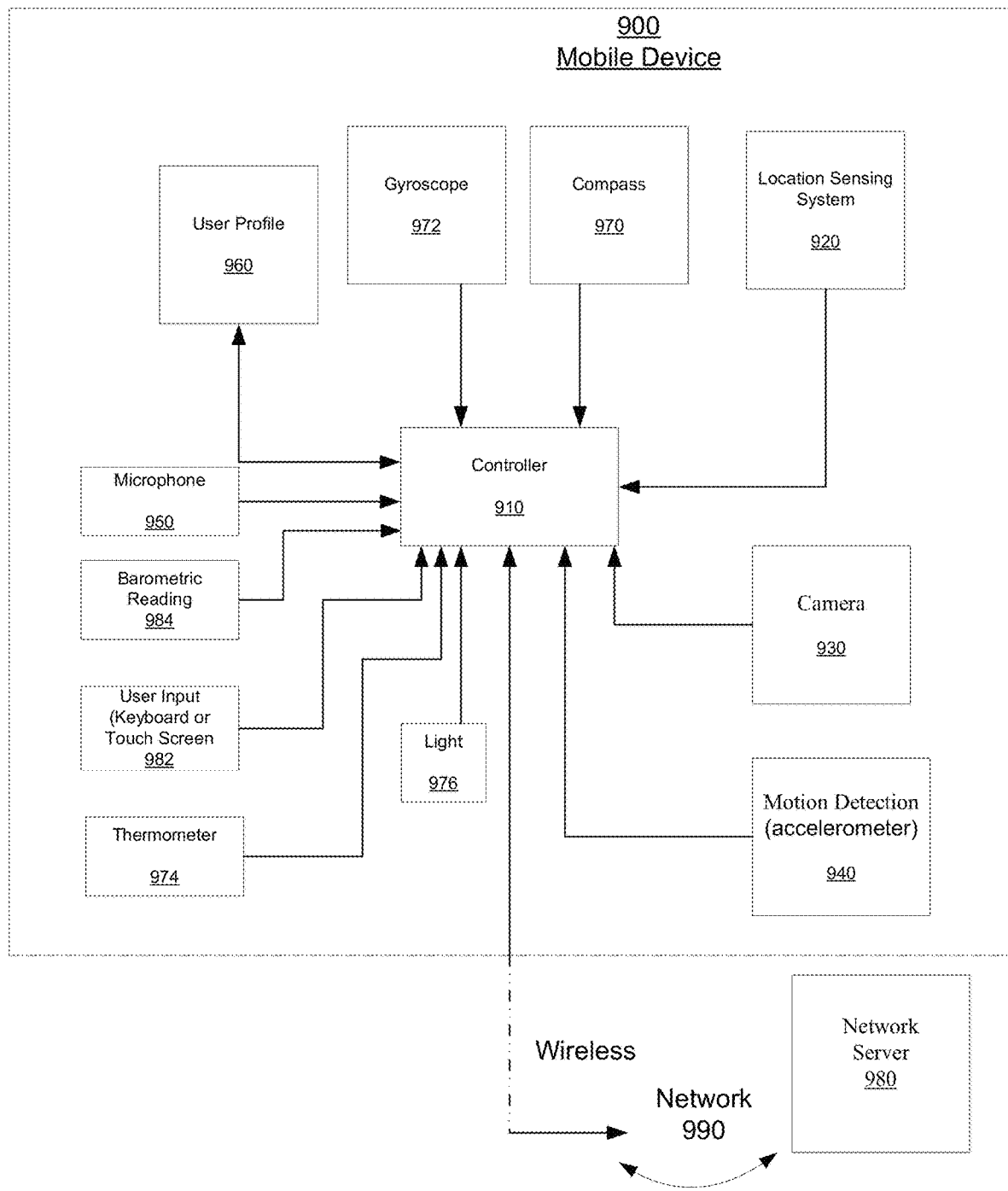
FIG. 9 shows an example of a mobile device (tracking device) that the disclosed embodiments are operable, according to an embodiment.

FIG. 9 shows an example of a mobile device (tracking device) that the disclosed embodiments are operable, according to an embodiment. For embodiments, user location data is continuously collected from the mobile device over time. The data can consist of multiple streams of sensor data with timestamps.

Spatial information (such as, longitude, latitude, altitude) of the user can be determined by a location sensing system, such as a global positioning system (GPS) 920 and/or network-based location, such as, location determined by cellular and/or WiFi networks of the mobile (tracking) device 900 as previously described. Based on the spatial information, a controller 910 (or another controller connected to the controller 910) of the mobile device 900 can roughly determine locations of the user. GPS, however, can be limited because the exact location or the actual business (point of interest) visited by the user may not determinable from GPS alone. Embodiments provide alternate or additional pieces of location information as determined by the controller 910, or a controller electronically connectable to the controller 910.

Signals sensed by a motion sensor (for example, an accelerometer) 940 can be used to provide additional user-related information. That is, for example, the GPS 920 may be precise enough to narrow down the identification of a location of interest to three businesses. The signals generated by the motion sensor 940 can provide an indication of activity of the user, which can be used to additionally identify a location of interest. For example, when a department store (e.g. Walmart®) is located next to a cafe (e.g. Starbucks®), the user's motion pattern can be used to disambiguate between the two POI (points of interest), Walmart and Starbucks. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Images captured by a camera 930 of the mobile device 900 can be used to provide additional user-related information. That is, for example, signs on business proximate to the user's location can be used to determined points of interest.

Audio signals sensed by a microphone 950 of the mobile device 900 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 970 of the mobile device 900. The compass 970 can provide present or historical directions of the user. The directions of the user can be used to aid in the determination of points of interest.

Rotation of the user can be determined by, for example, a gyroscope 972 of the mobile device 900. The gyroscope 972 can provide present or historical rotation of the mobile device of that the user carries. The rotation of the mobile device of the user can be used to aid in the determination of points of interest.

An ambient temperature of the user can be determined by, for example, a thermometer 974 of the mobile device 900. The thermometer 974 can provide present or historical ambient temperatures of the user. The temperature of the user can be used to aid in the determination of points of interest. For example, temperature can be used to determined whether the user is or was outside versus inside.

Exposure to ambient light by the user can be determined by, for example, a light sensor 976 of the mobile device 900. The light sensor 976 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 982. Based on a determination that the user is using the input (key-board or touch screen) behavior if the user can be inferred, and therefore, educated guesses can be made regarding the location of the user. For example, if the user is inputting information, the user is probably not driving. If the user is talking, the user is probably not at a movie theater.

Barometric information from a barometric sensor 984 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network 990 that the mobile device 900 is connected to, can provide additional user-related information. For example, a server 980 of the network can have street view images that provide additional information regarding a general location that a user is at. The connection to the remote server 980 is optional, because the mobile device may be disconnected from the server. In addition, part of the user profile 960 computation can be performed on the mobile device, and may not be required to be run on the server.

It is to be understood that the processing of the described embodiments for adaptively controlling a tradeoff between computational accuracy and power consumption of the mobile device 900 can occur at the controller 910, at the network server 980, or at a combination of both the controller 910 and the network server 980. If the connection of the network 990 allows the location information and/or sensor information to be properly uploaded to the network server 980, then nearly all of the adaptively controlling a tradeoff between computational accuracy and power consumption of a mobile device can occur at the network server. However, if the connection of the network 990 is not available, at least a portion of the processing for adaptively controlling a tradeoff between computational accuracy and power consumption of a mobile device can occur at the controller 910 of the mobile device 900.

For at least some embodiments, one or more of the sensed states of a combination of the sensed states of the described sensors (920, 930, 940, 950, 970, 972, 974, 976, 982, 984) and/or network connectivity (940) are used in processing for adaptively controlling a tradeoff between computational accuracy and power consumption of a mobile device. The sensed states of the sensors change over time. For an embodiment, patterns or a series of patterns in the one or more sensed states of the described sensors can be identified and/or recognized. For at least some embodiments, changes in the patterns indicate the user is arriving (start time) or departing (end time) a POI, or that the user is in transit between users stays or POIs. Therefore, for at least some embodiments, the information of the sensed states of the sensors can be used to determine user stays. For example, if the motion state (940) indicates that the user is stationary over a period of time, for at least some embodiments, this is used to identify the period of time as a potential user stay. If the network (940) is connected to a wireless station for a period of time, for at least some embodiments, this is used to identify the period of time as potential user stay. If a sensed light intensity of the light sensor 976 of the mobile device maintains a constant level (the same) of sensed light for a period of time, this information can be used to indicate a user stay. If the sensed temperature maintains the same level for a period of time, that information can be used to indicate a user stay.

Although specific embodiments have been described and illustrated, the embodiments are not to be limited to the specific forms or arrangements of parts so described and illustrated.

What is claimed:

1. A method of estimating a plurality of locations of an object, comprising:

simultaneously receiving, by a first radio of a tracking device attached to the object, a plurality of wireless signals from a plurality of base stations of a first network, wherein each of the plurality of wireless signals include information of each of the plurality of base stations of the first network that transmitted a corresponding wireless signal;

sensing, by the tracking device, motion of the object;

sampling, by the tracking device, the simultaneously received plurality of wireless signals at least three times in response to the sensing motion of the object while the tracking device is traveling along a one-dimensional path of a railroad track, wherein when no motion of the object is sensed, not more than one sampling of the simultaneously received plurality of wireless signals is performed;

downloading to the tracking device through a second radio of the tracking device from a second network, characterizations of the plurality of wireless signals along a same route of transit of the one-dimensional path of the railroad track, wherein the characterizations of the wireless signals are previously determined by a high-power location monitoring device that previously monitored locations with a GPS (global positioning system) receiver and measured and stored received wireless signal qualities while simultaneously receiving the plurality of wireless signals from the plurality of base stations multiple times while travelling the same route of transit of the one-dimensional path of the railroad track;

estimating the plurality of locations of the tracking device based on signal characteristic of the samples of the simultaneously received wireless signals received from the plurality of plurality of base stations, the information of the plurality of base stations, and predetermined knowledge of a transportation mode that is transporting the object including the characterizations of the simultaneously received wireless signals; and selecting, by the tracking device power modes for determining which of the plurality of sensors of the tracking device to activate;

wherein the power modes include a sleep mode, a mid-power mode, and a high-power mode, and wherein the tracking device cycles through the power modes.

2. The method of claim 1, further comprising:

receiving a set of predetermined tasks of the object associated with the tracking device;

selectively activating a plurality sensors of the tracking device based on the set of predetermined tasks;

estimating, by one or more sensors of the selectively activated plurality of sensors of the tracking device, the plurality of locations of the tracking device.

3. The method of claim 1, further comprising:

sensing, by the plurality of selectively activated sensors, sensed information of the tracking device; and selecting a condition of the object based on the estimated plurality of locations, the set of predetermined tasks, and the sensed information of the plurality of selectively activated sensors.

4. A method of estimating a plurality of locations of an object, comprising:

simultaneously receiving, by a first radio of a tracking device attached to the object, a plurality of wireless signals from a plurality of base stations of a first network, wherein each of the plurality of wireless signals include information of each of the plurality of base stations of the first network that transmitted a corresponding wireless signal;

sensing, by the tracking device, motion of the object;

sampling, by the tracking device, the simultaneously received plurality of wireless signals at least three times in response to the sensing motion of the object while the tracking device is traveling along a one-dimensional path of a railroad track, wherein when no motion of the object is sensed, not more than one sampling of the simultaneously received plurality of wireless signals is performed;

downloading to the tracking device through a second radio of the tracking device from a second network, characterizations of the plurality of wireless signals along a same route of transit of the one-dimensional path of the railroad track, wherein the characterizations of the wireless signals are previously determined by a high-power location monitoring device that previously monitored locations with a GPS (global positioning system) receiver and measured and stored received wireless signal qualities while simultaneously receiving the plurality of wireless signals from the plurality of base stations multiple times while travelling the same route of transit of the one-dimensional path of the railroad track;

estimating the plurality of locations of the tracking device based on signal characteristic of the samples of the simultaneously received wireless signals received from the plurality of plurality of base stations, the information of the plurality of base stations, and predetermined knowledge of a transportation mode that is transporting the object including the characterizations of the simultaneously received wireless signals;

sensing, by the plurality of selectively activated sensors, sensed information of the tracking device;

selecting a condition of the object based on the estimated plurality of locations, the set of predetermined tasks, and the sensed information of the plurality of selectively activated sensors; and reporting the condition of the object, receiving feedback from users regarding accuracy of the selected condition, and determining false positive identification of the reported condition of the object.

5. The method of claim 3, further comprising detecting a place of the object based on the estimated location, the condition of the object, and the sensed information of the plurality of selectively activated sensors.

6. The method of claim 3, further comprising:

reselecting which of the plurality of sensors of the tracking device are activated based on the condition of the object.

7. The method of claim 3, wherein selectively activating the plurality sensors of the tracking device includes selecting a sampling rate of one or more of the plurality of selectively activated sensors.

8. The method of claim 3, further comprising selecting the condition of the object based on a sensed acceleration, magnetic field, received RF signals (WiFi), received GPS signals, or rotation of the tracking device.

9. The method of claim 3, further comprising dynamically updating the selected sensed information based on the condition of the object.

10. The method of claim 3, further comprising determining one or more locations of the tracking device based on the condition of the object.

11. The method of claim 3, further comprising monitoring how long the object operates in one or more tasks of the set of predetermined tasks.

12. The method of claim 11, further comprising presenting a sequence of the monitored one or more tasks of the set of predetermined tasks of the object to a user.

13. The method of claim 1, wherein a task includes a condition of the object.

14. The method of claim 4, further comprising selecting, by the tracking device power modes for determining which of the plurality of sensors of the tracking device to activate.

15. The method of claim 14, wherein the power modes include a sleep mode, a mid-power mode, and a high-power mode, and wherein the tracking device cycles through the power modes.

16. The method of claim 1, further comprising:
selecting a condition of a plurality of objects, wherein each of the plurality of objects is associated with one of a plurality of tracking devices;
monitoring and coordinating, by the plurality of tracking devices, each of the plurality of objects.

17. A system for estimating a plurality of locations of an object, comprising:
a tracking device that is connectable to an upstream server, the tracking device operative to:
simultaneously receive, by a first radio of the tracking device attached to the object, a plurality of wireless signals from a plurality of base stations of a first network, wherein each of the plurality of wireless signals include information of each of the plurality of base stations of the first network that transmitted a corresponding wireless signal;
sensing motion of the object;
sample the simultaneously received plurality of wireless signals at least three times in response to the sensing motion of the object while the tracking device is traveling along a one-dimensional path of a railroad track, wherein when no motion of the object is sensed, not more than one sampling of the simultaneously received plurality of wireless signals is performed;
download to the tracking device through a second radio of the tracking device from a second network, characterizations of the plurality of wireless signals along a same route of transit of the one-dimensional path of the railroad track, wherein the characterizations of the wireless signals are previously determined by a high-power location monitoring device that previously monitored locations with a GPS (global positioning system) receiver and measured and stored received wireless signal qualities while simultaneously receiving the plurality of wireless signals from the plurality of base stations multiple times while travelling the same route of transit of the one-dimensional path of the railroad track;
estimate the plurality of locations of the tracking device based on signal characteristic of the samples of the simultaneously received wireless signals received from the plurality of plurality of base stations, the information of the plurality of base stations, and predetermined knowledge of a transportation mode that is transporting the object including the characterizations of the simultaneously received wireless signals;
select power modes for determining which of the plurality of sensors of the tracking device to activate;
wherein the power modes include a sleep mode, a mid-power mode, and a high-power mode, and wherein the tracking device cycles through the power modes.

18. The system of claim 17, wherein tracking device further operative to:
receive a set of predetermined tasks of an object associated with the tracking device;
selectively activate a plurality sensors of the tracking device based on the set of predetermined tasks;
estimate, by one or more sensors of the selectively activated plurality of sensors of the tracking device, the plurality of locations of the tracking device.

19. The system of claim 18, wherein tracking device further operative to:
sense, by the plurality of selectively activated sensors, sensed information of the tracking device; and
wherein at least one of the tracking device or the upstream server is operative to select a condition of the object based on the plurality of estimated location, the set of predetermined tasks, and the sensed information of the plurality of selectively activated sensors.

* * * * *